United States Patent
Soga et al.

(10) Patent No.: US 8,043,596 B2
(45) Date of Patent: Oct. 25, 2011

(54) METHOD FOR PRODUCING VAPOR GROWN CARBON NANOTUBE

(75) Inventors: Tetsuo Soga, Aichi (JP); Maheshwar Sharon, Maharashtra (IN); Rakesh Ashok Afre, Aichi (JP)

(73) Assignee: Showa Denko K.K., Tokyo (JP)

( * ) Notice: Subject to any disclaimer, the term of this patent is extended or adjusted under 35 U.S.C. 154(b) by 291 days.

(21) Appl. No.: 11/663,436

(22) PCT Filed: Sep. 21, 2005

(86) PCT No.: PCT/JP2005/017911
§ 371 (c)(1),
(2), (4) Date: Mar. 21, 2007

(87) PCT Pub. No.: WO2006/033457
PCT Pub. Date: Mar. 30, 2006

(65) Prior Publication Data
US 2008/0089828 A1 Apr. 17, 2008

Related U.S. Application Data

(60) Provisional application No. 60/717,180, filed on Sep. 16, 2005.

(30) Foreign Application Priority Data

Sep. 22, 2004 (JP) ................................ 2004-276174

(51) Int. Cl.
*D01F 9/12* (2006.01)
(52) U.S. Cl. ................ 423/447.1; 423/445 B; 423/199; 977/842; 977/843; 977/742

(58) Field of Classification Search .................. 423/199, 423/447.1, 447.2, 447.3, 445 B; 977/742, 977/750, 842
See application file for complete search history.

(56) References Cited

U.S. PATENT DOCUMENTS

| | | | |
|---|---|---|---|
| 6,884,404 B2 * | 4/2005 | Anazawa et al. | 423/447.1 |
| 2005/0287064 A1 * | 12/2005 | Mayne et al. | 423/445 B |

FOREIGN PATENT DOCUMENTS

| | | | |
|---|---|---|---|
| EP | 1 481 946 A1 | 12/2004 | |
| JP | 2001-348215 A | 12/2001 | |
| JP | 2004-26626 A | 1/2004 | |
| JP | 200426626 | * | 1/2004 |

(Continued)

OTHER PUBLICATIONS

Fazle Kibria, A. K.M. et al. Synthesis of Carbon nanotbues Over Nickel-iron catalysts Supported on Alumian Under Controlled Conditions. Catalyst Letters 71 (3-4) 2001.*

(Continued)

*Primary Examiner* — Stuart Hendrickson
*Assistant Examiner* — Richard M Rump
(74) *Attorney, Agent, or Firm* — Sughrue Mion, PLLC

(57) ABSTRACT

The invention provides a method for producing carbon nanotubes, comprising spraying an oil onto a catalyst metal supported by at least one support selected from the group consisting of silica gel, alumina, magnesia, silica-alumina and zeolite which is placed in an atmosphere that has been controlled to a specific temperature, and an apparatus therefor. According to the invention, a large amount of carbon nanotubes can be synthesized from inexpensive raw materials by using a simple apparatus.

9 Claims, 2 Drawing Sheets

FOREIGN PATENT DOCUMENTS

| | | | |
|---|---|---|---|
| JP | 2004-176244 A | | 6/2004 |
| JP | 2004-256373 A | | 9/2004 |
| JP | 2004-270088 A | | 9/2004 |
| WO | 02/49412 A1 | | 6/2002 |
| WO | WO 03/068676 A1 | | 8/2003 |
| WO | WO 03000727 A2 | * | 12/2003 |
| WO | 2004/083119 A1 | | 9/2004 |

OTHER PUBLICATIONS

Chatterjee, A. K. CVD Synthesis of Carbon nanotubes using a Finley Dispersed Cobalt catalyst and THeir Use in Double Layer Electrochemical capacitors. Electrochemica Acta 48 (2003) 3439-3446.*

Afre, R. A. et al. "Growth of Veritically Aligned carbon Nanotubes on Silicon and Quartz Substrate by Spray Pryolsysi of a Natural Precursor: Turpentine Oil". Chemical Physics Letters 414 (2005) p. 6-10.*

Rakesh A. Afre, T. Soga, T. Jimbo, Mukul Kumar, Y. Ando, M. Sharon, Growth of vertically aligned carbon nanotubes on silicon and quartz substrate by spray pyrolysis of a natural precursor: Turpentine oil, Chemical Physics Letters, vol. 414, Issues 1-3, Oct. 3, 2005, pp. 6-10, Available online Aug. 30, 2005.*

Zheng, G.; Zhu, H.; et al. "Chemical Vapor Deposition Growth of Well-Aligned Carbon Nanotube Patternson Cubic Mesoporous Silica Films by Soft Lithogrpahy." Chem. Mater. 2001, 13, 2240-2242.*

Kumar, M.; Ando, Y., "Controlling the diameter distribution of carbon nanotubes grown from camphor on a zeolite support". Carbon 43 (2005) 533-540.*

Pradhan et al, "Carbon nanotubes, nanofilaments and nonobeads by thermal chemical vapor deposition process", Materials Science and Engineering B, Elsevier Sequoia, Lausanne, CH, vol. 96, No. 1, Oct. 1, 2002, pp. 24-28, XP004382400.

* cited by examiner

METHOD FOR PRODUCING VAPOR GROWN CARBON NANOTUBE

CROSS-REFERENCE TO RELATED APPLICATIONS

This application is an application filed pursuant to 35 U.S.C. Section 111(a) claiming the benefit of U.S. provisional application 60/717,180 filed Sep. 16, 2005 under the provision of 35 U.S.C. 111(b), pursuant to 35 U.S.C. Section 119(e)(1).

TECHNICAL FIELD

The present invention relates to a method for producing vapor grown carbon fiber and carbon nanotubes, which method allows mass production thereof at low cost and by means of a simple process.

BACKGROUND ART

Vapor grown carbon fiber and carbon nanotubes (unless otherwise specified, both vapor grown carbon fiber and carbon nanotubes are hereinafter collectively referred to as "carbon nanotubes") have been extensively studied in terms of their applications in, for example, field emitters, transistors, sensors, hydrogen occlusion, conductive plastics, fuel cells and solar cells.

Currently, carbon nanotubes are generally produced through the CVD method employing a raw material gas such as methane; the arc discharge method employing a solid raw material such as graphite (Japanese Patent Application Laid-Open (kokai) No. 2004-256373); or the laser ablation method. Carbon nanotubes produced through any of these methods are expensive, because of high costs for raw materials and apparatuses.

In the future, when carbon nanotubes come to be used in large amounts, a low-cost method for the synthesis therefor will definitely be needed. In addition, natural resources present in the natural world and recycled raw materials will come to be employed from environmental considerations. Furthermore, oils that are consumed via combustion are required to be fixed as carbon nanotubes, from the viewpoint of reduction in amount of carbon dioxide emitted to the atmosphere.

Among various production methods for carbon nanotubes, the CVD method—a type of vapor growth technique—is the lowest-cost method for producing carbon nanotubes. However, since the production cost is still unsatisfactory and remains to be further reduced, there is a demand for a carbon nanotube production method which allows mass production of carbon nanotubes at lower cost.

FIG. 1 is a schematic representation of an example reactor for continuously producing carbon nanotubes through vapor growth. In one typical procedure for producing carbon nanotubes, a hydrocarbon such as CO, methane, acetylene, ethylene, benzene or toluene is employed as a feedstock. In the case where the feedstock hydrocarbon assumes the gaseous state at room temperature, the hydrocarbon is mixed with a carrier gas, thereby serving as a feedstock. In the case where the hydrocarbon assumes the liquid state, the liquid is vaporized, and then mixed with a carrier gas, thereby serving as a feedstock. Alternatively, liquid hydrocarbon may be sprayed into a heating zone. As a catalyst, a supported catalyst where a metal is supported on a support such as alumina or an organometallic compound such as ferrocene is used. When a supported catalyst is employed, the catalyst is placed in a reaction zone in advance and heated, and is subjected to essential preliminary treatment. Subsequently, a feedstock hydrocarbon is supplied to the catalyst for reaction (as illustrated in FIG. 1). Alternatively, reaction may also be carried out by feeding in a continuous or pulse-like manner from the outside to the reactor, a supported catalyst that has been preliminarily treated. In a still alternative procedure, a feedstock hydrocarbon and an organometallic compound such as ferrocene, which is a homogeneous catalyst precursor compound, are fed to the heating zone in a continuous or pulse-like manner, and the catalyst precursor compound is thermally decomposed to form metallic particles serving as a catalyst, whereby carbon nanotubes can be formed in the presence of the catalyst. The thus-formed product is collected by a collector disposed at the outlet of the heating zone or inside the heating zone. After the collected product has been subjected to a reaction for a predetermined period of time, the product is recovered.

Carbon nanotube production methods employing vapor phase growth are generally classified into the following two types:

(a) a method in which a substrate or a boat formed of alumina or graphite which supports a catalyst or a precursor compound thereof is placed in a heating zone, and the catalyst or the precursor is brought into contact with a hydrocarbon gas fed from a vapor phase (Chemical Physics Letters, 384 (2004), 98-102); and (b) a method in which a metallocene or a carbonyl compound is dissolved in a liquid hydrocarbon to serve as a catalyst precursor, and the hydrocarbon solution containing the catalyst precursor compound is fed to a heating zone, whereby the catalyst is brought into contact with the hydrocarbon at high temperature (Japanese Patent Application Laid-Open (kokai) No. 2004-176244).

According to the above method (a), carbon nanotubes can be produced at a relatively low temperature of 1,000° C. or lower. However, percent conversion of hydrocarbon gas to carbon nanotubes is low, resulting in an increase in raw material cost, which is problematic.

Hereinafter, the term "percent conversion" refers to a value obtained by dividing the amount of collected solid by the amount of raw material used.

In the case of the above method (b), a hydrocarbon such as benzene or toluene is generally employed. When such a hydrocarbon is used, percent conversion reaches 50% or higher, which is a comparatively high value. However, reaction must be carried out at a temperature as high as 1,000° C. or higher, leading to an increase in fuel and facility costs.

Since these two methods employ flammable gases such as hydrogen serving as a carrier gas and hydrocarbon gas, limitations are imposed on the material and structure of production apparatuses, which elevates costs.

The hydrocarbons employed as carbon sources are all produced from fossil fuels, which is not preferred from the viewpoint of environmental issues. If natural carbon sources present in the natural world and recycled raw materials can be employed, environmental load can be reduced.

DISCLOSURE OF THE INVENTION

Currently, carbon nanotubes are synthesized from expensive raw materials and by means of expensive apparatuses, making the produced carbon nanotubes expensive, which is problematic.

Thus, an object of the present invention is to provide a method for producing carbon nanotubes, which method allows synthesis thereof at comparatively low temperature and at high percent conversion of a hydrocarbon feedstock.

The present invention has solved the aforementioned problems through synthesis of carbon nanotubes from inexpensive oil serving as a raw material. Use of oil—liquid matter—causes no leakage and requires no vacuum conditions during synthesis as described in Patent Document 1, whereby a simple apparatus can be employed for synthesis of carbon nanotubes. In addition, since natural vegetable oil or waste oil obtained from plastics or similar materials can be used as a raw material oil, the invention is free from resource depletion and is friendly to the environment.

FIG. 2 shows an apparatus employed in the present invention for synthesizing carbon nanotubes. The apparatus includes an electric furnace (1), a bubbler (2), a spray nozzle (3), and a flask (4) for receiving an oil serving as a raw material. In contrast with the method disclosed in Patent Document 1, carbon nanotubes are synthesized without employing vacuum conditions. In addition, since the raw material is a liquid which causes no leakage, a simple apparatus can be employed.

The present inventors have conducted extensive studies in order to solve the aforementioned problems, and have found that a large amount of carbon nanotubes can be produced, at comparatively low temperature and high percent conversion of raw material, from an inexpensive natural oil serving as a carbon-source compound for producing carbon nanotubes under specific reaction conditions with a specific catalyst.

Accordingly, the present invention is directed to, for example, the following methods for producing carbon nanotubes 1 to 11; apparatus for producing carbon nanotubes 12; and carbon nanotube 13.

1. A method for producing carbon nanotubes, comprising spraying an oil onto a catalyst metal placed in an atmosphere that has been controlled to a specific temperature.
2. A method for producing carbon nanotubes, comprising spraying an oil onto a catalyst metal that is supported by at least one support selected from the group consisting of silica gel, alumina, magnesia, silica-alumina and zeolite, in an atmosphere that has been controlled to a specific temperature.
3. The method for producing carbon nanotubes as described in 1 or 2 above, wherein the catalyst metal is nickel, cobalt, iron, or a mixture thereof.
4. The method for producing carbon nanotubes as described in 2 above, wherein the catalyst metal is allowed to be supported by the support through impregnation of the support with a melt of a compound of the catalyst metal.
5. The method for producing carbon nanotubes as described in 2 above, wherein the ratio by mass of metal elements contained in the compound of the catalyst metal to the support is 10 to 70%.
6. The method for producing carbon nanotubes as described in 4 above, wherein the compound of the catalyst metal has a melting point of 100° C. or lower.
7. The method for producing carbon nanotubes as described in 1 or 2 above, wherein the temperature is controlled to 500 to 1,000° C.
8. The method for producing carbon nanotubes as described in 7 above, wherein the temperature is controlled to 550 to 750° C.
9. The method for producing carbon nanotubes as described in 1 or 2 above, wherein the oil is selected from among a natural oil derived from a plant, an animal oil, and a plastic waste oil.
10. The method for producing carbon nanotubes as described in 9 above, wherein the natural oil is selected from among turpentine oil, eucalyptus oil, rapeseed oil, palm oil, corn oil, rape oil, and sunflower oil.
11. The method for producing carbon nanotubes as described in 2 above, wherein nitrogen gas serving as a carrier gas is used at the time of the spraying at a ratio by volume from 0.1 to 0.001 based on the volume of the oil.
12. An apparatus for producing carbon nanotubes comprising an electric furnace, a spray nozzle, and a flask for receiving a raw material oil.
13. A carbon nanotube produced through a method as recited in any one of 1 to 11 above.

DETAILED DESCRIPTION OF THE INVENTION

Figure 1:
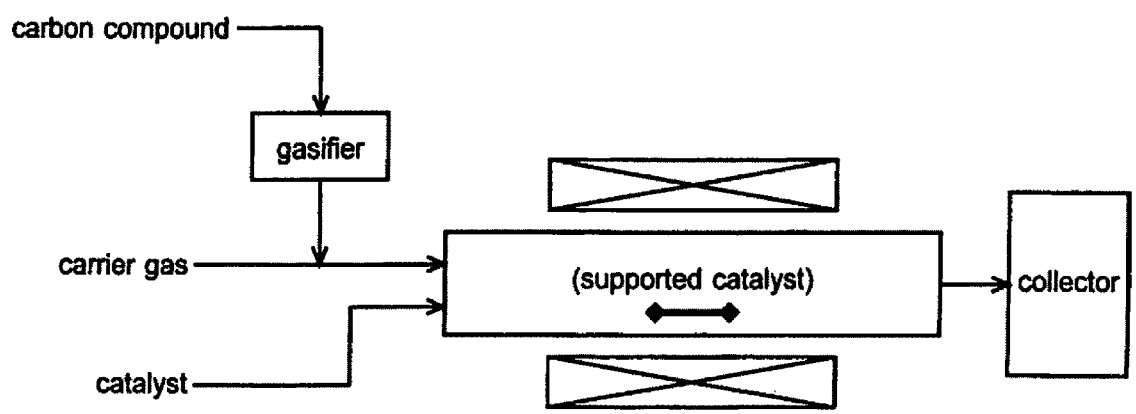
FIG. 1 is a schematic representation of a conventional apparatus for synthesizing carbon nanotubes.

The present invention will next be described in more detail, with reference to the attached drawings in accordance with need. Hereinafter, unless otherwise specified, the quantitative ratios "part" and "%" are on a mass basis.

The present invention has realized synthesis of carbon nanotubes through a simple technique; i.e., employing as a raw material a natural oil derived from a plant, a plastic waste oil, or a similar oil and spraying the raw material onto a catalyst metal placed in an atmosphere at 500 to 1,000° C.

Specifically, a characteristic feature of the present invention is that a large amount of carbon nanotubes can be produced at comparatively low temperature and high percent conversion through reaction of a carbon source compound (1) in the presence of a specific catalyst (2) under specific reaction conditions (3).

[Carbon Source Compound]

In the method for producing carbon nanotubes of the present invention, one characteristic feature is use of generally known oil such as a natural vegetable oil, an animal oil, or a recycled oil as a raw material for carbon nanotubes.

Examples of the recycled oil include a plastic waste oil and used oil for deep frying.

No particular limitation is imposed on the form of the natural vegetable oil, and drying oil, semi-drying oil, non-drying oil, etc. may be employed. Among these vegetable oils, those which are liquid at ambient temperature are preferred, since liquid form oils are readily reacted under the specific reaction conditions according to the present invention. For example, a camphor oil (liquid at ambient temperature) obtained from a camphor tree is preferred, but the simultaneously obtained camphor—solid at ambient temperature—is not preferred. Examples of the vegetable oil which are liquid at ambient temperature include turpentine oil, eucalyptus oil, rapeseed oil, cotton seed oil rice bran oil, soy bean oil, palm oil, corn oil, rape oil, olive oil, peanut oil, castor oil, and sunflower oil.

In some cases where an oil which is solid at ambient temperature is used, it is preferable to heat the oil to thereby use the oil in a liquid state. In this case, the solid preferably has a melting point of 100° C. or lower, more preferably 50° C. or lower. Examples of the oil which is solid at ambient temperature include palm oil having a high melting point.

Needless to say, these vegetable oils may be used singly or in combination of two or more species.

In general, a natural vegetable oil contains many kinds of components. Thus, one or more components per se contained in the vegetable oil may also be used as a raw material.

Examples of such components as preferably employed include terpenes such as α-pinene, β-pinene, camphene, limonene, and phellandrene; sterols such as sitosterol, campesterol, and stigmasterol; glycerol triacetate; safrole; cineole; and terpineol.

Through reaction of any of these natural vegetable oils with a specific catalyst mentioned later under specific conditions, carbon nanotubes can be produced in a large amount at high percent conversion, as compared with a conventional production method employing methane or ethylene as a raw material. In addition, the present method allows low-temperature synthesis of carbon nanotubes, reducing production cost, as compared with a production method employing benzene or toluene as a raw material.

[Catalyst]

Another characteristic feature of the present invention is use of a specific catalyst in addition to the aforementioned carbon source compound. The catalyst is preferably a metallic compound containing at least one element selected from the group consisting of the elements belonging to Group 3 to Group 12, more preferably a compound containing at least one element selected from the group consisting of the elements belonging to Group 3, 5, 6, 8, 9, or 10. Specifically, a compound containing iron, nickel, cobalt, ruthenium, rhodium, palladium, platinum, or a rare earth metal element is preferred, and an iron-cobalt bi-component catalyst and a nickel-cobalt bi-component catalyst are particularly preferred.

In feeding to a heating zone, these metallic compounds are preferably supported by a support. The support is preferably a compound containing at least one element selected from the group consisting of Al, Si, Mg, and Ca, with an oxide containing the element(s) being particularly preferred. Specifically, silica gel, alumina, magnesia, silica-alumina, and zeolite are most preferred.

The amount of metallic compound supported by the support is preferably 5 to 100%, as a ratio by mass of metal to support, most preferably 10 to 70%. When the amount of metallic compound supported by the support is small, carbon nanotubes are produced in a less amount, whereas when the amount is in excess of 70%, undesirable amorphous carbon is produced.

No particular limitation is imposed on the method for causing a catalyst metal to be supported on the support. In a generally employed carrying method where a catalyst metal compound is dissolved in a solvent and a support is impregnated with the formed solution, followed by drying/heating in accordance with needs, a catalyst having a support supporting a large amount of metal compound is generally difficult to produce. Therefore, in a preferred mode, a catalyst metal compound having low melting point is heated to melt, and a support is impregnated with the formed melt, followed by heating/crushing in accordance with needs. From such a viewpoint, the metallic compound preferably has a melting point of 200° C. or lower, more preferably 100° C. or lower, most preferably 60° C. or lower. Examples of the catalyst metal compound having such a low melting point include halides such as chlorides and bromides; sulfates; nitrates; and organic complexes having a cyclopentadienyl ring. Of these, nitrates such as iron nitrate, cobalt nitrate, and nickel nitrate are particularly preferred.

The optimum heating temperature for melting varies depending of the type of the catalyst metal compound and, therefore, cannot be generally determined. However, the heating temperature is preferably within a range of the melting point or higher but the decomposition temperature or lower, more preferably within a range of from the melting point to a temperature 20° C. higher than the melting point. In the cases where some catalyst metal compounds are employed, partial decomposition is preferred. In such a case, heating over the decomposition temperature is sometimes preferred. When the heating temperature for melting is excessively high, decomposition of the catalyst metal compound may excessively proceed, which is not preferred. Thus, the heat treatment temperature is about 40 to 100° C., with 50 to 80° C. being particularly preferred.

After completion of impregnation of a support with a melt, crushing/grain-size control is performed in accordance with needs. In addition, heating, reducing, or a certain type of modification may also be carried out.

Thus, in a most preferred mode for causing a catalyst metal to be supported on the support, a nitrate of iron, cobalt or nickel is heated at 50 to 80° C. for dissolution, and a support such as silica gel, alumina, magnesia, or zeolite is added to the solution for impregnation, followed by cooling/crushing.

[Synthesis of Carbon Nanotubes]

Vapor phase synthesis of carbon nanotubes is attained through spraying the aforementioned carbon source compound with an optional carrier gas to a catalyst metal or to a support supporting a catalyst metal which is placed in an atmosphere whose temperature has been controlled to a specific reaction temperature.

The carrier gas to be used can possibly be a reducing gas such as hydrogen, which has been conventionally employed in vapor growth synthesis of carbon nanotubes. However, according to the present invention, high percent conversion can be attained also in an inert atmosphere such as nitrogen, an inert gas is preferably employed as a carrier gas. In addition, the method of the present invention, which does not require use of highly flammable gas such as hydrogen, is economically advantageous in that the method has a broad options in raw materials and structures of apparatuses and does not require use of expensive apparatuses.

The ratio by volume of oil serving as a carbon source to carrier gas is preferably 1 to 0.0002, more preferably 0.1 to 0.001, most preferably 0.01 to 0.002.

Although the optimum reaction temperature varies in accordance with the type of carbon source compounds employed and other factors, the reaction temperature is preferably 500 to 1,000° C., most preferably 550 to 750° C. When benzene or toluene is employed as a raw material, reaction must be carried out at 1,000° C. or higher. According to the present invention, reaction temperature can be remarkably lowered. The reaction temperature employed in the present invention is almost equivalent to that employed in the case where methane or ethylene is used as a carbon source. However, percent conversion of raw material to carbon nanotubes can be remarkably enhanced, which is economically more advantageous.

BEST MODE FOR CARRYING OUT THE INVENTION

The present invention will next be described in more detail by way of examples, which should not be construed as limiting the invention thereto.

In the Examples and the Comparative Examples, the following reagents, apparatus, etc. were employed.

[Reagents]
Cobalt nitrate hexahydrate, nickel nitrate hexahydrate, and iron nitrate nonahydrate: reagents, products of Nacalai Tesque, Inc.
Silica gel: reagent, product of Aldrich
Turpentine oil: reagent, product of Nacalai Tesque, Inc.
Zeolite: HSZ-390HUA, product of Tosoh Corporation

Figure 2:
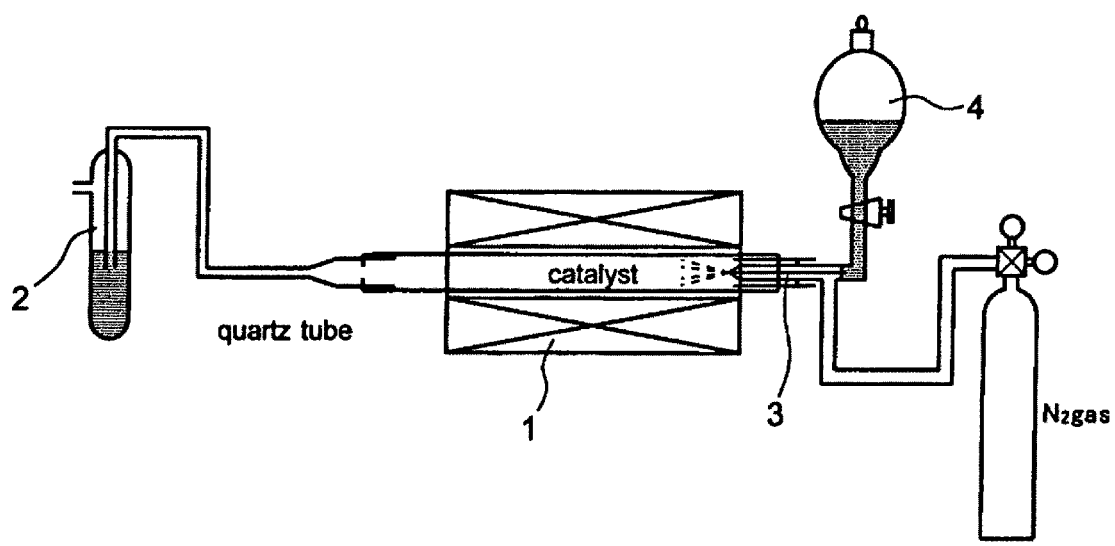
FIG. 2 is a sketch of an example of the apparatus according to the present invention for synthesizing carbon nanotubes.

[Reactor]
FIG. 2 is a schematic representation of an exemplary apparatus for synthesizing carbon nanotubes. The apparatus includes an electric furnace (1), a spray nozzle (3), a bubbler (2), and a flask (4) for receiving an oil.

Example 1

Catalyst Preparation

Iron nitrate nonahydrate (3 g) and cobalt nitrate hexahydrate (3 g) were heated at 65° C., to thereby form a uniform melt. Under stirring, silica gel (2 g) was gradually added to the melt, to thereby form a uniform wet powder. After cooling, the powder was left to stand overnight in a drier at 40° C., and the thus-formed aggregates were crushed by use of a mortar.

[Reaction]
A quartz boat carrying a catalyst (0.1 g) was placed in a reactor and heated to 700° C. (reaction temperature). A turpentine oil extracted from pine oil and serving as a raw material was sprayed onto the catalyst metal by the mediation of pressurized nitrogen. The turpentine oil was fed at a feeding rate of 0.5 g/min, with a nitrogen flow at 100 cc/min. The feeding was carried out for 10 min (equivalent to about 6 cc of oil) to cause reaction. After completion of reaction, the product was collected and measured in terms of mass. Through dividing mass of the collected product by mass of the raw material, percent conversion was calculated to be 30%. Through observation of the product under a scanning electron microscope, the formed carbon nanotubes were found to have a fiber diameter of about 30 nm.

Examples 2 to 5

The procedure of Example 1 was repeated, except that catalyst preparation was performed under the conditions specified in Table 1. The results are also shown in Table 1.

TABLE 1

| | Catalyst preparation conditions | | | | | | Results |
|---|---|---|---|---|---|---|---|
| | Catalyst source 1 | Amount | Catalyst source 2 | Amount | Support | Amount | Recovery |
| Example 1 | Iron nitrate nonahydrate | 3 g | Cobalt nitrate hexahydrate | 3 g | Silica gel | 2 g | 30% |
| Example 2 | Iron nitrate nonahydrate | 3 g | Nickel nitrate hexahydrate | 3 g | Silica gel | 2 g | 16% |
| Example 3 | Cobalt nitrate hexahydrate | 3 g | — | | Silica gel | 1 g | 12% |
| Example 4 | Iron nitrate nonahydrate | 3 g | — | | Silica gel | 1 g | 10% |
| Example 5 | Nickel nitrate hexahydrate | 3 g | — | | Silica gel | 1 g | 5% |

Comparative Example 1

The procedure of Example 1 was repeated, except that methane gas (500 cc/min) was used instead of turpentine oil, the flow rate of nitrogen gas was altered to 500 cc/min, and reaction was performed for 20 minutes (Table 2). Percent conversion was found to be 0.1%.

Figure 3:
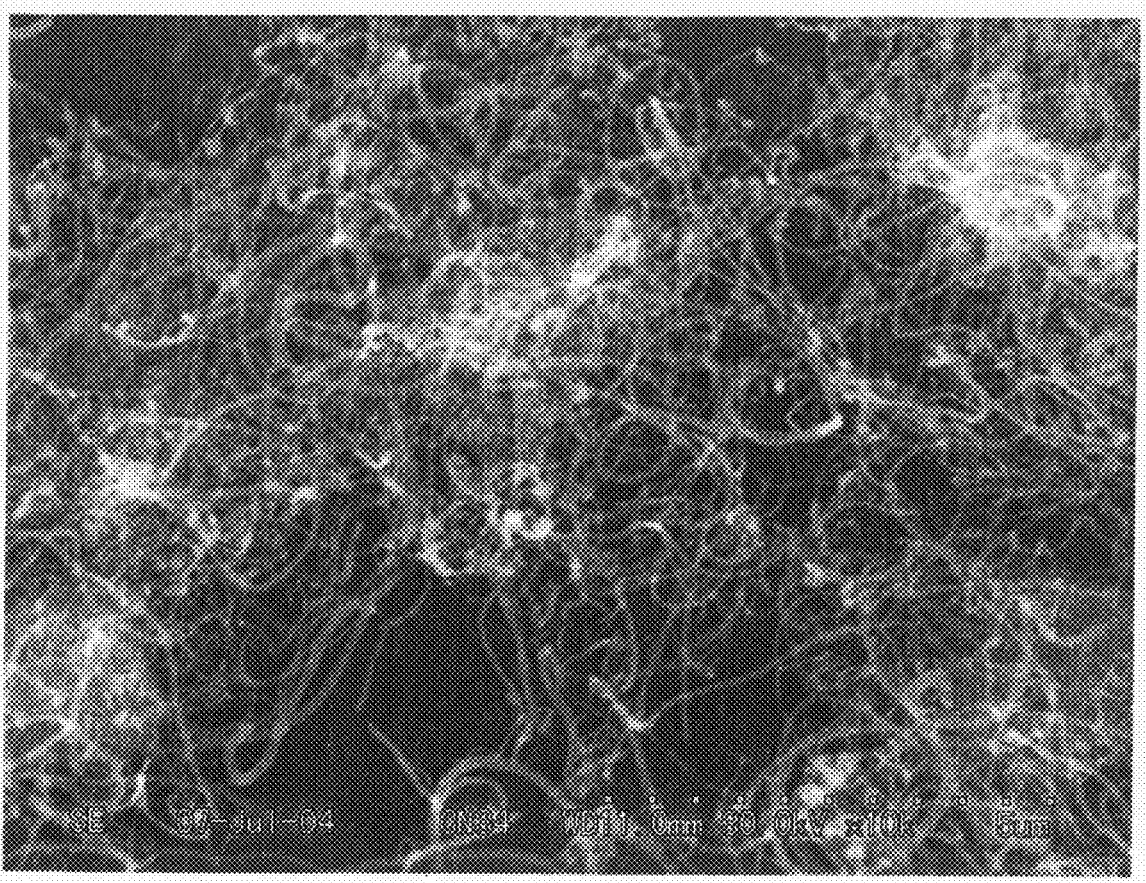
FIG. 3 is a photograph of the carbon nanotube of the present invention captured under a scanning electron microscope.

When a Co—Fe mixture (Example 1) or an Ni—Fe mixture (Example 2) was employed as a catalyst metal, carbon nanotubes were produced in a large amount. When Co (Example 3) or Fe (Example 4) was employed, carbon nanotubes were also produced. However, when a Co—Ni mixture or Ni (Example 5) was employed, carbon nanotubes were produced in merely a small amount, but percent conversion was remarkably higher as compared with the case in which methane was employed as a raw material (Comparative Example 1). FIG. 3 is a photograph of the produced carbon nanotubes after purification, as captured under a scanning electron microscope.

Examples 6 to 8 and Comparative Example 2

The procedure of Example 1 was repeated, except that raw materials shown in Table 2 were employed, and the flow rate of nitrogen was altered to 500 cc/min.

Carbon nanotubes could be synthesized from natural oils such as eucalyptus oil (Example 7), rapeseed oil, corn oil (Example 8), and rape oil. Carbon nanotubes could be also synthesized from recycled oils such as an oil recycled from plastics and used deep frying oil. Percent conversion of these oils to carbon nanotubes were as remarkably high as 50% or higher.

TABLE 2

| | Raw material | Recovery | Product |
|---|---|---|---|
| Example 6 | eucalyptus oil | 10% | carbon nanotubes |
| Example 7 | palm oil | 11% | carbon nanotubes |
| Example 8 | corn oil | 10% | carbon nanotubes |
| Comp. Ex. 1 | methane | 0.1% | carbon nanotubes |
| Comp. Ex. 2 | ethyl alcohol | | amorphous carbon |

Example 9 and Comparative Example 3

The procedure of Example 1 was repeated, except that reaction temperature was altered as shown in Table 3.

TABLE 3

| | Reaction temperature | Recovery | Product |
|---|---|---|---|
| Example 9 | 500° C. | 2% | carbon nanotubes |
| Comp. Ex. 3 | 450° C. | — | amorphous carbon |

Examples 10 to 12

The procedure of Example 1 was repeated, except that nitrogen gas flow rate was altered as shown in Table 4.

TABLE 4

| | Nitrogen flow rate | Oil/nitrogen ratio by volume | Recovery |
|---|---|---|---|
| Example 10 | 200 cc/min | 0.0030 | 50% |
| Example 11 | 500 cc/min | 0.0012 | 10% |
| Example 12 | 1,000 cc/min | 0.0006 | 5% |

Example 13

The same procedure was conducted except that a catalyst was prepared by dissolving iron nitrate nonahydrate (0.4 g) and cobalt nitrate hexahydrate (0.4 g) in ethanol (10 cc), subsequently adding zeolite (1 g) to the solution, subjecting the mixture to ultrasonication for 10 minutes, drying the mixture overnight at 50° C. and grinding the resultant product by use of a mortar. Percent conversion was found to be 25%.

INDUSTRIAL APPLICABILITY

Characteristic features of the present invention include low apparatus cost, low material cost, use of natural resources and recycled material as raw materials, and high percent conversion to carbon nanotubes. Therefore, carbon nanotubes can be mass-produced at low cost. Furthermore, according to the present invention, a variety of oils can be fixed as carbon, leading to a reduction in amount of carbon dioxide exhaust gas.

The thus-produced carbon nanotubes find various applications, such as in field emitters, transistors, sensors, hydrogen occlusion, conductive plastics, fuel cells, and solar cells.

The invention claimed is:

1. A method for producing vapor grown carbon nanotubes by vapor synthesis, comprising spraying an oil in a liquid state onto a catalyst metal placed in an atmosphere that has been controlled to a specific temperature,
wherein the catalyst metal is supported by a support,
wherein the ratio by mass of metal elements contained in the catalyst metal to the support is 13.6 to 70%, and
wherein the temperature is controlled to 500 to 1,000° C.

2. The method for producing carbon nanotubes as claimed in claim 1, wherein the catalyst metal is nickel, cobalt, iron, or a mixture thereof.

3. The method for producing carbon nanotubes as claimed in claim 1, wherein the temperature is controlled to 550 to 750° C.

4. The method for producing carbon nanotubes as claimed in claim 1, wherein the oil is selected from among a natural oil derived from a plant, an animal oil, and a plastic waste oil.

5. The method for producing carbon nanotubes as claimed in 4, wherein the natural oil is selected from among turpentine oil, eucalyptus oil, rapeseed oil, palm oil, corn oil, rape oil, and sunflower oil.

6. A method for producing vapor grown carbon nanotubes by vapor synthesis, comprising spraying an oil in a liquid state onto a catalyst metal that is supported by at least one support selected from the group consisting of silica gel, alumina, magnesia, silica-alumina and zeolite, in an atmosphere that has been controlled to a specific temperature,
wherein the ratio by mass of metal elements contained in the catalyst metal to the support is 13.6 to 70%, and
wherein the temperature is controlled to 500 to 1,000° C.

7. The method for producing carbon nanotubes as claimed in claim 6, wherein the catalyst metal is allowed to be supported by the support through impregnation of the support with a melt of a compound of the catalyst metal.

8. The method for producing carbon nanotubes as claimed in claim 7, wherein the compound of the catalyst metal has a melting point of 100° C. or lower.

9. The method for producing carbon nanotubes as claimed in 6, wherein nitrogen gas serving as a carrier gas is used at the time of the spraying at a ratio by volume from 0.1 to 0.001 based on the volume of the oil.

* * * * *